United States Patent [19]

Pos

[11] Patent Number: 5,169,004

[45] Date of Patent: Dec. 8, 1992

[54] METHOD OF AND APPARATUS FOR TREATING BUILDING RUBBLE

[75] Inventor: Jacobus Pos, Groenlo, Netherlands

[73] Assignee: K-Pack Systems International, Neede, Netherlands

[21] Appl. No.: 812,689

[22] Filed: Dec. 23, 1991

[30] Foreign Application Priority Data

Aug. 29, 1991 [DE] Fed. Rep. of Germany ....... 4128665
Oct. 18, 1991 [DE] Fed. Rep. of Germany ....... 4134487

[51] Int. Cl.$^5$ .............................................. B03B 7/00
[52] U.S. Cl. ........................................... 209/17; 209/5
[58] Field of Search .................... 209/4, 5, 12, 17, 173, 209/172.5, 172

[56] References Cited

U.S. PATENT DOCUMENTS

| | | | |
|---|---|---|---|
| 2,635,104 | 4/1953 | Chayen | 209/173 |
| 2,784,468 | 3/1957 | Booth et al. | 209/173 |
| 4,175,035 | 11/1979 | Moyer | 209/5 |

FOREIGN PATENT DOCUMENTS 2161310 6/1972 Fed. Rep. of Germany .

OTHER PUBLICATIONS

"Bauschuttaufbereitung Recycling of building rubble, R. Heckötter, Aufbreitungs-Technik, No. 8/1987", pp. 443, 446 and 447.

Primary Examiner—H. Grant Skaggs
Attorney, Agent, or Firm—Peter K. Kontler

[57] ABSTRACT

Large and medium-sized particles of sand which is contained in building rubble are separated from a mixture of rubble and water prior to introduction of water, contaminants and small particles of sand into a separator with internal laminations to segregate the small particles of sand. The thus obtained residue containing contaminants and water is flocculated and is thereupon treated in one or more settling units or flotation units to segregate the contaminants which are skimmed off the surface of the body of liquid in the unit and/or removed by a feed screw in the bottom zone of the unit. The thus purified water is reused, and the segregated solid contaminants are dehydrated, if necessary, to be disposed of at special dumping facilities. Separation of small particles of sand increases the percentage of reusable rubble and reduces the percentage of material which must be delivered to special dumping facilities.

17 Claims, 5 Drawing Sheets

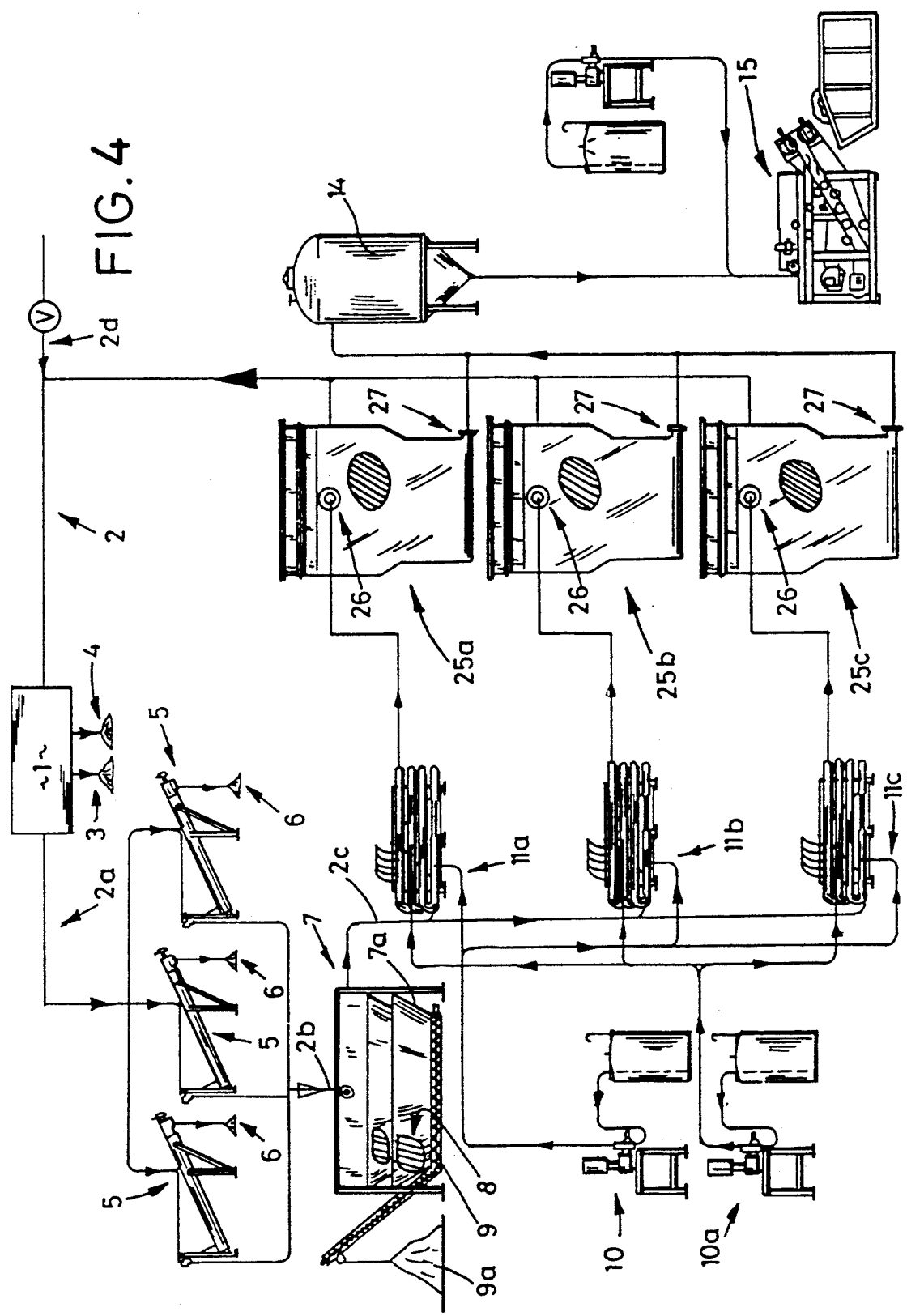

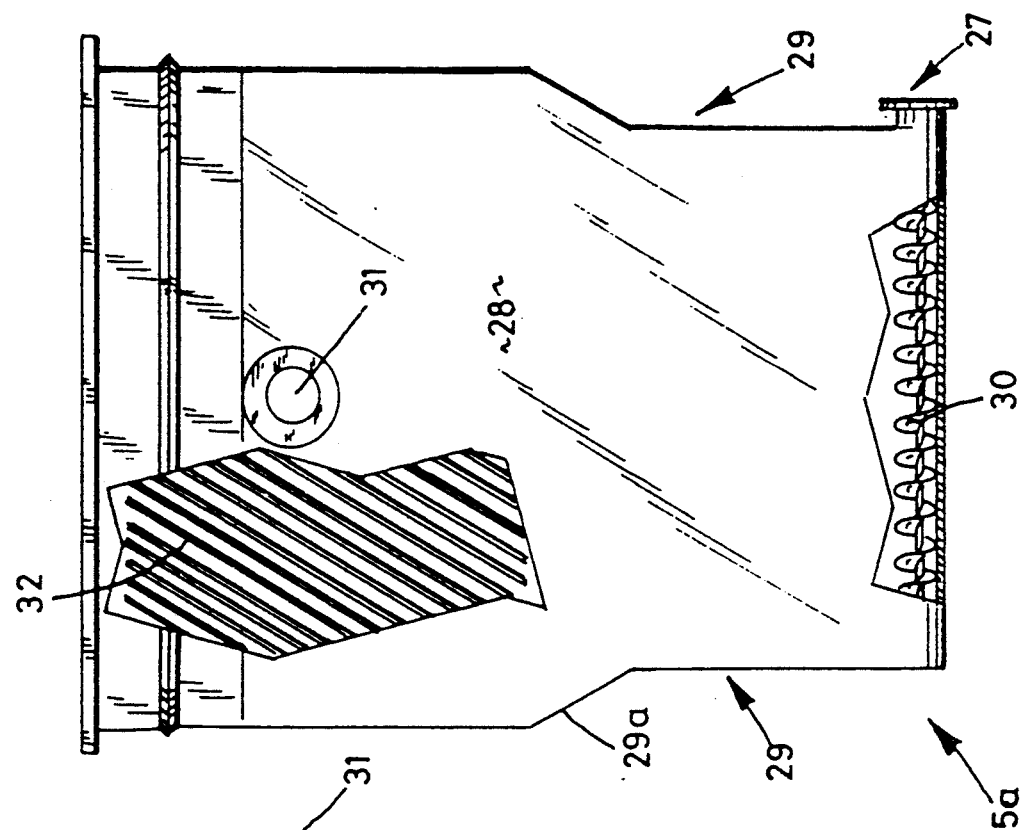
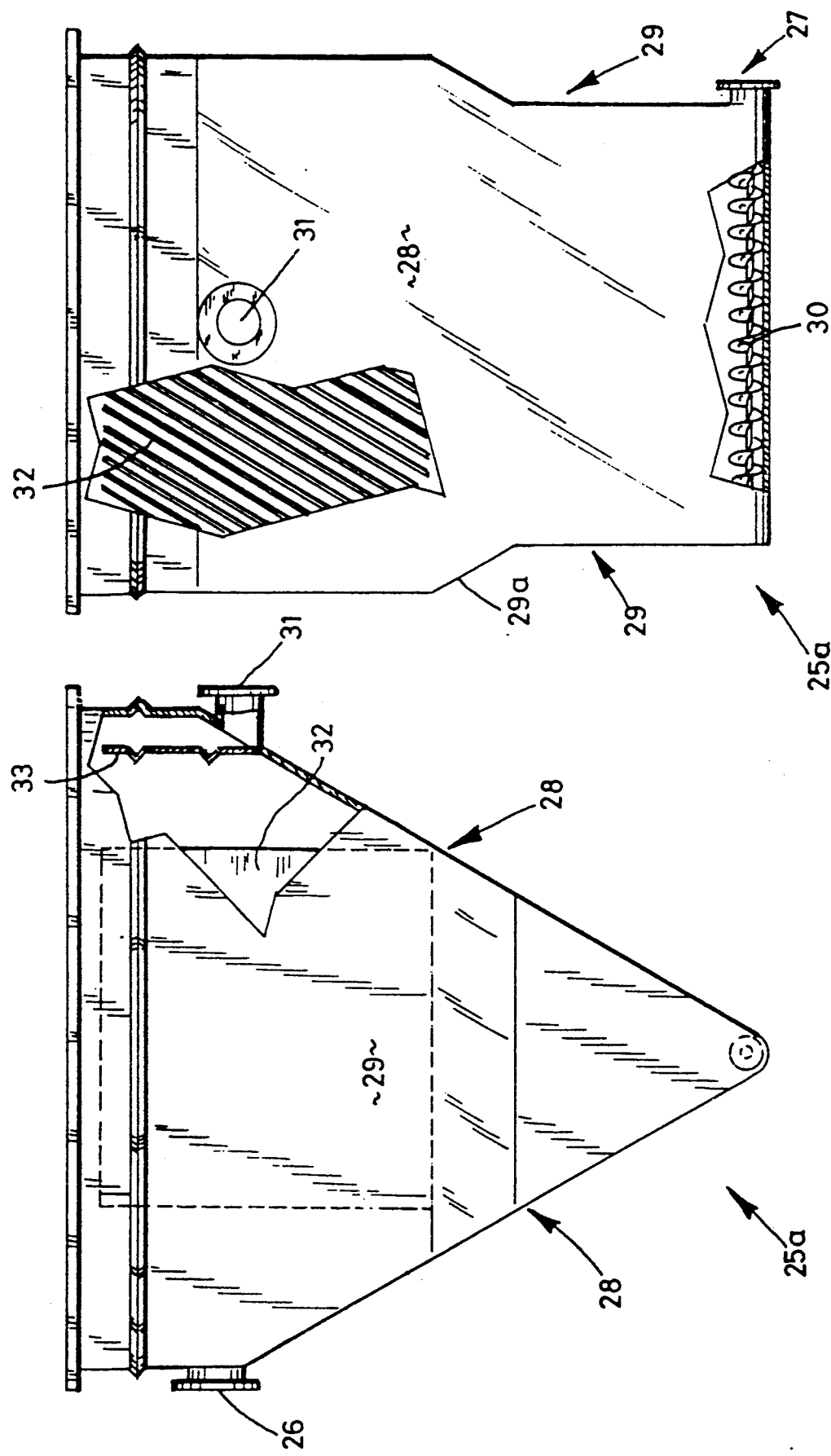

METHOD OF AND APPARATUS FOR TREATING BUILDING RUBBLE

BACKGROUND OF THE INVENTION

The invention relates to improvements in methods of and in apparatus for classifying and/or otherwise treating rubble, such as building rubble. More particularly, the invention relates to improvements in methods of the type described on pages 443, 446 and 447 of German-language publication entitled "AUFBEREITUNG-STECHNIK" (No. 8, 1987) and to improvements in apparatus of the type disclosed in German patent application No. 21 61 310 Eder (published Jun. 29, 1972).

Treatment (particularly cleaning) of rubble presents many problems, especially in the building industries. For example, sand which is obtained from building rubble is often unsuitable for utilization in connection with the making of concrete because individual sand particles in the form of granules, kernels or the like are frequently coated with films of contaminants consisting of fine dust or the like. Such contaminants prevent proper bonding of particles of sand in concrete. Serious problems are encountered in connection with further processing of building rubble regardless of the origin of such material, e.g., as a result of demolition of buildings and/or as a result of comminution of pieces of rock, stone or the like. Furthermore, the thus Obtained coarser and/or finer particles of sand cannot always be deposited at regular dumping grounds because many federal and/or regional authorities enforce strict rules pertaining to the degree of permissible contamination of sand which is to be deposited on such dumping grounds. Therefore, the materials must be subjected to an expensive cleaning or decontaminating treatment prior to being discharged at standard or regular dumping grounds, or they must be transported to specially designated dumping facilities. All this involves the expenditure of substantial sums of money. In addition, the materials are wasted, i.e., they are not recycled for renewed use in the building and/or related industries. Still further, it is desirable to avoid the deposition of large quantities of potentially reusable materials at special dumping facilities in order to avoid rapid saturation of such facilities and the need for establishment of fresh facilities for disposal of certain types of bulky materials such as building rubble. As a rule, building rubble will contain various chemicals, which are classified as contaminants, as well as fragments of wood and other natural substances.

In accordance with heretofore known proposals, cleaning of building rubble involves segregation of large and medium-sized sand particles from small and very small particles. Such segregation is carried out in water which continues to contain small and very small particles of sand as well as certain other contaminants (particularly heavy metals, polyaromatic substances and/or others) when the step of segregating large and medium large sand particles is completed. Turbid water which contains heavy metals, polyaromatic substances and/or other contaminants and small and very small particles of sand is thereupon treated to separate the solid and liquid fractions. The thus segregated solid matter must be delivered to and disposed at special dumping facilities. The presence of fine sand particles contributes to the bulk of material which must be disposed of at special dumping facilities and, furthermore, such fine particles of sand are wasted, i.e., they are not reused in the building and/or other industries.

Apparatus which are used to relieve water of minute particles of sand and/or other contaminants subsequent to recovery of large and medium-sized sand particles normally employ vessels with laminations which are completely immersed in the body of liquid (normally water) to be treated. The solid particles are supposed to settle at the bottom of the vessel and are removed at intervals. Each such removal involves the development of a pressure shock or thrust which propagates itself through the entire vessel and creates turbulence which affects the quality and prolongs the duration of segregation of solid particles. The shocks or thrusts are sufficiently pronounced to exert a pronounced adverse influence upon the water purifying treatment. Thus, the shocks affect the segregation of particles which are to rise to the surface o the body of water in the vessel as well as the segregation of particles which are supposed to descend into the bottom portion of the vessel. Consequently, solids which are removed from the surface as well as from the bottom zone of the vessel contain a very high percentage of water. This is undesirable irrespective of whether the thus separated solid materials are to be recycled or dumped at special dumping facilities. Water which is contained in the materials to be dumped adds to the overall weight of the materials to be disposed of. On the other hand, any percentage of water (or an excessive percentage of water) in a mass of segregated solid material which is to be recycled (e.g., in the building industry) must be segregated from the solid fraction in an additional step which contributes to the already high cost of a conventional recycling operation.

OBJECTS OF THE INVENTION

An object of the invention is to provide a simple and inexpensive method of treating building rubble.

Another object of the invention is to provide a method which renders it possible to efficiently separate fine particles of sand from a liquid carrier.

A further object of the invention is to provide a method of reducing the percentage of building rubble which must be disposed of at special dumping facilities.

An additional object of the invention is to provide a novel and improved method of separating fine particles of sand from water.

Still another object of the invention is to increase the percentage of sand which can be recovered from building rubble for reuse in building and related industries.

A further object of the invention is to provide a method of treating a mixture of liquid and small or very small solid particles subsequent to separation of larger and medium-sized solid particles.

Another object of the invention is to provide a novel and improved apparatus for the practice of the above outline method.

An additional object of the invention is to provide the apparatus with novel and improved means for segregating small and very small particles of sand from an aqueous carrier.

Another object of the invention is to provide the apparatus with novel and improved means for treating water subsequent to separation of large and medium-sized particles of building rubble.

An additional object of the invention is to provide a novel and improved apparatus for treating flocculated liquids.

Another object of the invention is to provide novel and improved means for separating solid constituents from a liquid fraction by sedimentation and/or flotation.

An additional object of the invention is to provide an apparatus which can segregate minute solid particles from a liquid carrier in such a way that the segregated solid fraction contains a low percentage of liquid.

SUMMARY OF THE INVENTION

One feature of the present invention resides in the provision of a method of processing building rubble which contains large, medium-sized and small solid particles, particularly particles of sand and one or more contaminants. The method comprises the steps of mixing rubble with a liquid (such as water), separating large and medium-sized particles from the thus obtained mixture to form a residue (e.g., a filtrate) which contains contaminants, liquid and small solid particles, admitting the residue into an internally laminated separating vessel and separating the contaminants and liquid from at least some of the small particles, flocculating the separated liquid to accumulate therein floccules of small particles, if any, and contaminants, and segregating the floccules from the liquid.

The segregating step can include separating the floccules by sedimentation and/or by flotation.

The step of separating the liquid and contaminants of the residue from some of the small particles can comprise continuously evacuating the thus separated small particles from the separating vessel.

Another feature of the invention resides in the provision of an apparatus for processing building rubble which contains large, medium-sized and small solid particles (particularly particles of sand) and contaminants. The improved apparatus comprises means for mixing rubble with a liquid (such as water), a first treating unit including means for separating large and medium-sized particles from the thus obtained mixture to form a residue of filtrate Which contains contaminants, liquid and small particles, a second treating unit including means for treating the residue and having a vessel provided with internal laminations serving to promote separation of contaminants and liquid from at least some of the small particles and means for evacuating the thus separated small particles from the vessel, and a third treating unit including means for flocculating the separated contaminants-containing liquid to form floccules, a receptacle for confinement of flocculated liquid (i.e., a liquid which contains floccules of contaminants and small particles, if any, and means for segregating floccules from the liquid.

In accordance with a presently preferred embodiment, the liquid is caused to fill the receptacle to a predetermined level and the segregating means includes several sets of lamellae in the receptacle. Such sets include a first set beneath the liquid level and a second set located above the first set and extending upwardly at least to the liquid level. The floccules in the receptacle are caused or tend to rise to and above the liquid level, and the segregating means further includes means for skimming or scraping floccules off the liquid above the second set of lamellae. The skimming or scraping means can comprise at least one scraper and means for moving the at least one scraper relative to the receptacle and relative to the aforementioned portion of the second set of lamellae. The moving means can comprise means (e.g., one or more chains) for advancing the at least one scraper along an endless path.

At least some lamellae of the first set can be inclined with respect to at least some lamellae of the second set, and at least some lamellae of at least one of the sets of lamellae can be inclined with respect to a vertical plane. The arrangement can be such that at least some lamellae of the first set are inclined in a first direction and at least some lamellae of the second set are inclined in a second direction at least substantially counter to the first direction.

The receptacle can include a downwardly tapering lower portion for collection of solid matter (namely contaminants and small solid particles, if any), and the segregating means can further comprise means (e.g., a rotary feed screw) for evacuating collected solid matter from the lower portion of the receptacle.

In accordance with another presently preferred embodiment of the apparatus, the receptacle is basically a settling tank having a downwardly tapering lower portion for collection of solid matter, and means (such as the aforementioned feed screw) for evacuating solid matter from the lower portion of the receptacle. The segregating means can comprise a plurality of lamellae in the tank, at least in part above the lower portion of the tank. The latter can be provided with an inlet for flocculated liquid, an outlet for liquid which has been separated from floccules, and an inlet for fresh liquid.

The apparatus can further comprise means for recirculating at least some liquid from the receptacle into the mixing means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is a schematic elevational view of an apparatus which constitutes a modification of the apparatus of FIG. 1;

FIG. 5 is a side elevational view of a settling tank in the apparatus of FIG. 4, with a portion of one end wall of the tank broken away; and FIG. 6 is an end elevational view of the settling tank, with a portion of one sidewall broken away.

DESCRIPTION OF PREFERRED EMBODIMENTS

Figure 1:
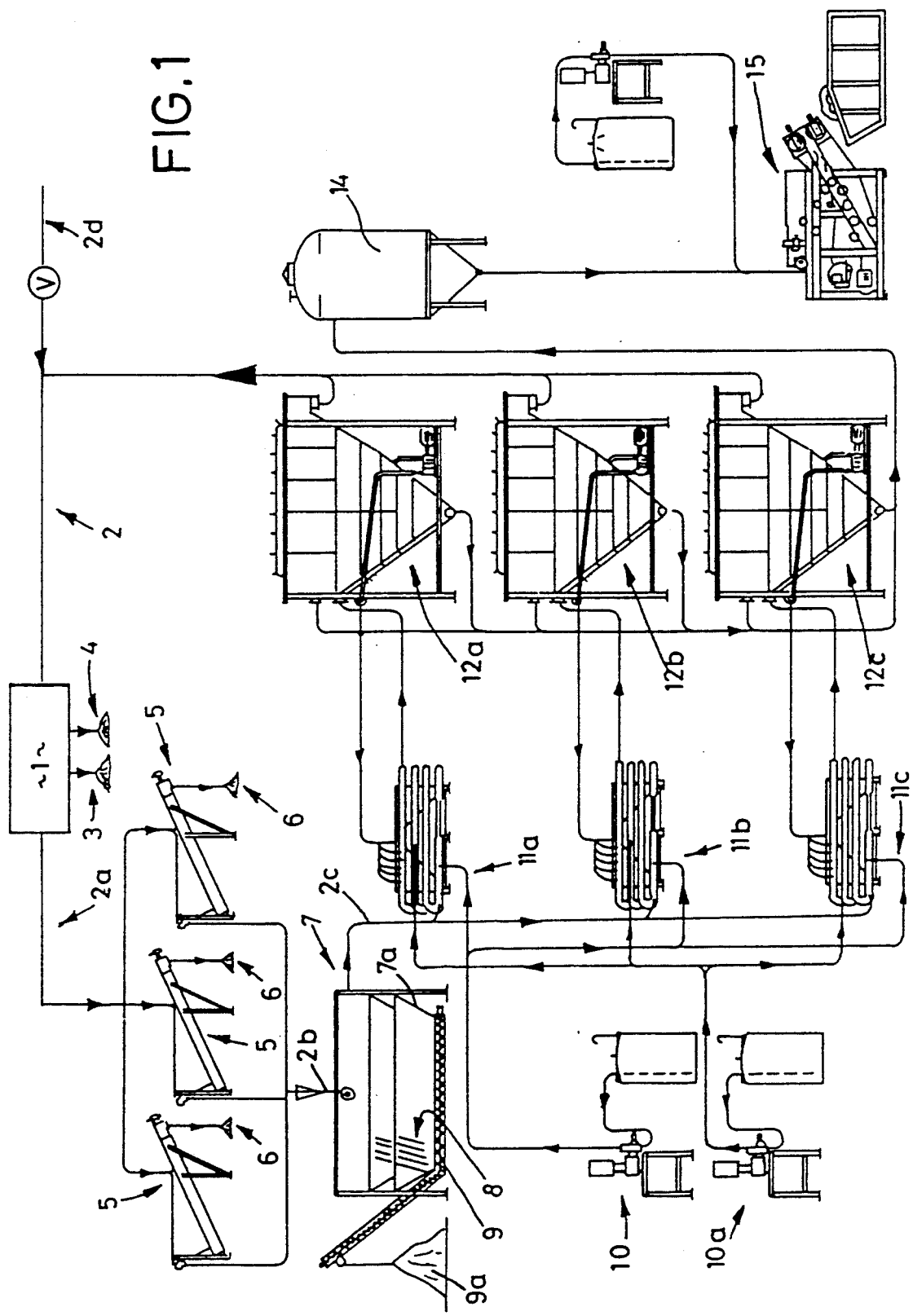
FIG. 1 is a schematic elevational view of an apparatus which embodies one form of the invention.

Referring first to FIG. 1 there is shown an apparatus which can classify building rubble according to the sizes of sand particles and which can purify the liquid (normally water) that is used to simplify the classifying action as well as to remove from the segregated particles dust and other foreign matter that would interfere with or prevent recycling of the classified particles. The apparatus comprises a mixing unit 1 wherein building rubble containing large, medium-sized and small particles of sand is mixed with water. A stream of water is supplied by one or more conduits 2, and the mixing unit 1 is provided with standard equipment (first treating unit) for separating largest and large particles of sand from the aqueous carrier so that the stream in the conduit or conduits 2a contains a mixture consisting of water, medium-sized particles of sand, small particles of sand and certain contaminants such as polycyclical aromates, oils and heavy metals. An accumulation of separated largest particles is shown at 3, and an accumulation of separated large particles is shown at 4. The accumulations 3 and 4 can be collected in discrete bunkers for largest and large sand particles, respectively.

The mixture which enters the conduit or conduits 2a is delivered to three preferably identical separators 5 each of which contains a rotary feed screw serving to separate medium-sized sand particles which gather into piles 6, e.g., in discrete bunkers for medium-sized material. The accumulations which are shown at 3 and 4 (hereinafter referred to as piles of large particles) and the accumulations which are shown at 6 are ready for reuse in the building industry.

The residue which leaves the separators 5 via conduits 2b contains water, small particles of sand as well as contaminants including (in many instances) polycyclical aromates, oils and heavy metals. The conduits 2b deliver the residue to a further separator 7 of the type somewhat similar to that used in certain branches of the food industries. The illustrated separator 7 comprises a vessel 7a for one or more sets of laminations 8 and evacuating means including at least one feed screw 9 which is disposed at the bottom of the vessel 7a and delivers at least some of the small particles of sand to a pile 9a. Thus, the stream which leaves the vessel 7a via conduit or conduits 2c contains water, contaminants and some small particles of sand, if any.

The utilization of the separator 7 constitutes a departure from heretofore known procedures which involve the addition of a flocculant to the stream leaving the separators 5 via conduit or conduits 2b so that the floccules which are formed in accordance with prior proposals contain all of the small particles of sand as well as the contaminants. In other words, the separator 7 ensures the recovery of a huge percentage or all of small particles which are delivered to the pile 9a nd can be reused in the building industry or elsewhere.

The separator 7 is designed to separate from the mixture of liquid and contaminants at least a major percentage of small sand particles with a particle size as small as 10 microns ($10^{-6}$m). On the other hand, heretofore known apparatus which do not employ the separator 7 cannot recover small sand particles with a size below 63 microns. In other words, the stream in the conduit or conduits 2c does not contain any, or contains a negligible percentage of, sand particles which are larger than 10 microns.

The vessel 7a of the separator 7 is a relatively large container or settling tank which accommodates a large number of parallel or substantially parallel laminations 8, e.g., at an angle of 50°-60° to the horizontal or vertical. For example, the neighboring laminations 8 can be separated by clearances or gaps having a width of approximately 2 cm which is desirable because such design of the structure in the interior of the vessel 7a ensures the establishment of very short paths for the smallest sand particles in the liquid carrier.

The period of dwell of residue flowing through the vessel 7a (i.e., the quantity and speed of flowable material entering and leaving the vessel 7a per unit of time) is selected in such a way that the flow in the separator 7 is a substantially laminar flow. This ensures that the heaviest solid particles which have entered the vessel 7a (namely the small particles of sand) descend in the separator 7 at a low speed. On the other hand, the velocity of flow of liquid fraction through the vessel 7a suffices to maintain the contaminants (such as polycyclic aromates, oil and heavy metals) in suspended condition to be reliably evacuated from the vessel 7a by way of the conduit or conduits 2c.

The bottom portion of the vessel 7a preferably tapers downwardly to resemble an elongated trough having a substantially triangular cross-sectional outline or the shape of a cone, and the aforementioned evacuating means or feed screw 9 is located at the lower end of such downwardly tapering lower portion to evacuate small particles of sand and to form the pile 9a, either continuously or at selected intervals. It is preferred to utilize a motor (not shown) which drives the feed screw 9 without interruptions. The utilization of evacuating means in the form of a feed screw (particularly a continuously driven feed screw) in lieu of a flap-shaped valve or gate, which is provided in the bottom region of the vessel of a separator and is opened only at certain intervals, is much more satisfactory because the feed screw does not adversely affect the rate of flow of water and contaminants through the vessel 7a, namely from the conduit or conduits 2b to the conduit or conduits 2c. This is highly desirable because the operation of the separator 7 is more predictable and this separator can reliably separate all or practically all particles having a size in excess of 10 microns. The predictability of operation of the separator 7 is enhanced still further ia the feed screw 9 is maintained in continuous rotary motion. The material which forms the pile 9a can be reused in the building and/or other industries.

As a rule, the stream or streams which leave the vessel 7a of the separator 7 via conduit or conduits 2c contains only Water and contaminants as well as (perhaps) some extremely small particles of sand. Such residue is admitted into three flocculators 11a, 11b, 11c each of which receives a flocculant from a first source 10 and/or from a second source 10a. The flocculators 11a, 11b, 11c form part of flotation units 12a, 12b, 12c, respectively, each of which comprises a settling tank or receptacle 17 (FIG. 2) and is designed to segregate the liquid fraction from floccules (which contain contaminants) so that the thus segregated liquid fraction can be returned from the outlets of the receptacles 17 into the conduit 2, i.e., for reuse in the mixing unit 1.

An advantage of the flocculating means 10, 10a, 11a, 11b, 11c is that the quantity of flocculant to be admitted to the streams which are supplied by the conduit or conduits 2c is relatively small. This is desirable for ecological reasons. The reasons for savings of flocculant will be readily appreciated since the flocculant or flocculants which are supplied by the source 10 and/or 10a must flocculate only the contaminants and perhaps a very small quantity of remaining small particles of sand. The majority of small solid particles are separated in the vessel 7a to form the pile 9a. Thus, the flocculating step need not involve the segregation of small particles of sand which form the pile 9a because such particles are segregated from the liquid fraction ahead of the receptacles 17.

Figure 2:
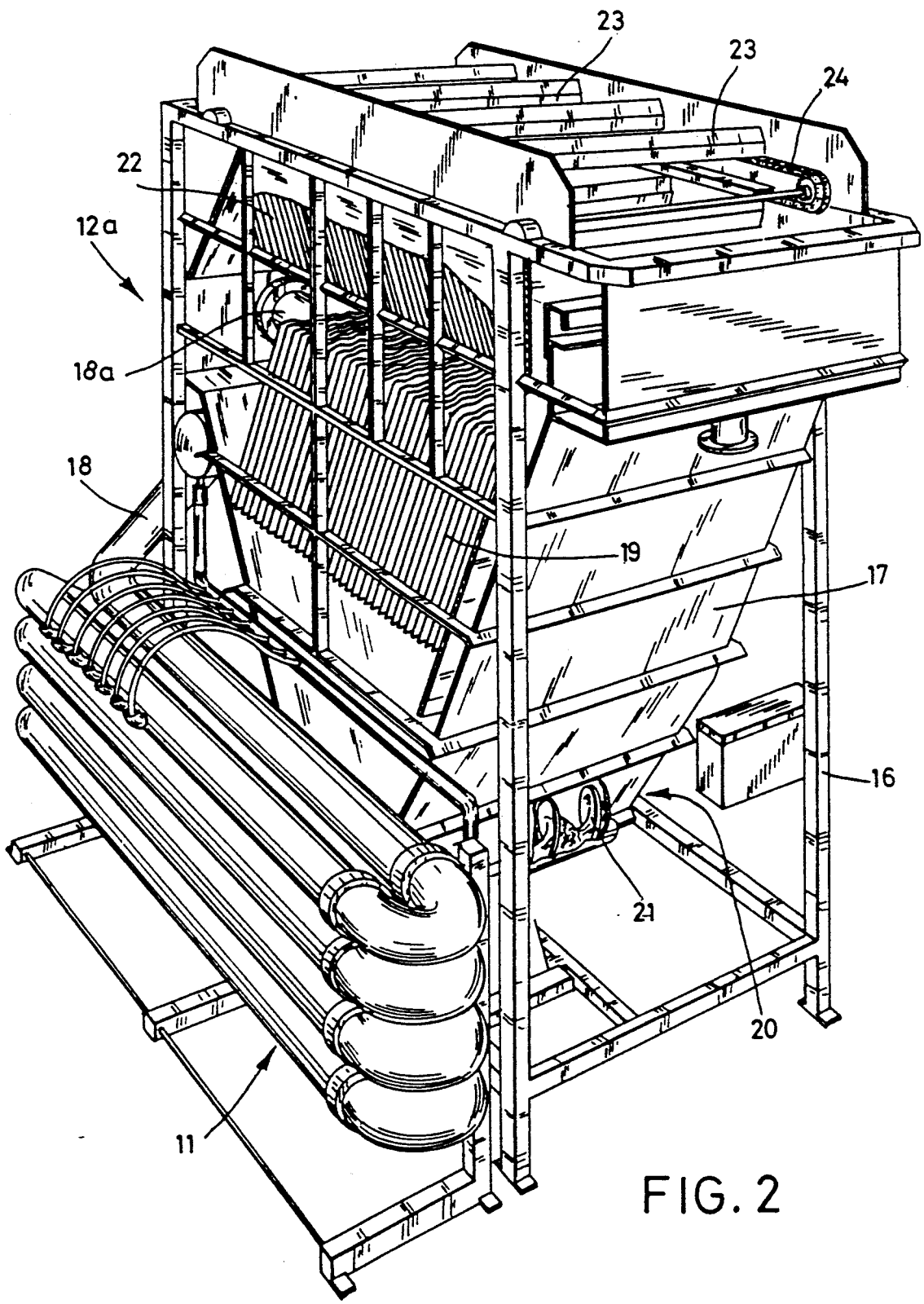
FIG. 2 is a fragmentary perspective view of a flotation unit in the apparatus of FIG. 1.

Certain details of the flotation unit 12a (including the flocculator 11a and a settling tank or receptacle 17) are shown in FIG. 2. The segregated contaminants are conveyed to a collecting station 14 (e.g., an upright tank) which, in turn, delivers the mixture of water and contaminants to a filtering press 15. The latter serves to expel a rather high percentage of water to thus reduce the bulk and weight of material which must be delivered to special dumping facilities (not shown) with attendant savings in costs of transportation and space at the dumping facilities.

A certain percentage of liquid which is admitted to the mixing unit 1 is lost at 5, 7 and 17. Therefore, the conduit 2 is connected with a valved conduit 2d which can supply a required quantity of fresh water from a suitable source, not shown.

Referring to FIG. 2, the flotation unit 12 which is shown therein includes a frame 16 for the flocculator 11a and the respective receptacle or settling tank 17. The conduit 2c of FIG. 1 delivers a stream of residue from the vessel 7a into the lower portion of the flocculator 11a, and the latter has an outlet 18 which is located downstream of an elongated serpentine path and delivers flocculated liquid to the inlet 18a of the receptacle 17. The elongated serpentine path which is defined by the flocculator 11a ensures adequate flocculation of contaminants which are carried by the liquid stream toward the outlet 18. The flocculant which was admitted by the source 10 and/or 10a ensures that the floccule of contaminants exhibit a tendency to rise in the receptacle 17. The unit 12 is or can be equipped with means for admitting an atomized gaseous fluid into the bottom zone of the receptacle 17 in order to promote the upward movement of the floccules, i.e., such floccules gather at the level of the upper surface of the body of liquid in the vessel 17.

It is often desirable to admit to the residue flowing from the vessel 7a into the receptacle 17 (or in the receptacle 17) one or more coagulants which cause the heavier components of contaminants to gather into clumps or batches and to descend into the bottom zone (collecting trough) 20 of the receptacle 17 and to be evacuated by a horizontal feed screw 21 for delivery into the tank 14.

The illustrated receptacle 17 contains two sets of lamellae, namely a lower or main set of lamellae 19 and an upper set of lamellae 22 extending at least to the level of the top surface of the body of liquid in the receptacle. The lamellae 19 of the lower set contribute to pronounced calming of the flow and thus ensure that the coagulated heavier contaminants or floccules of contaminants do not entrain a high percentage of liquid into the range of the feed screw 21. The illustrated receptacle 17 has a substantially V-shaped cross-sectional outline and tapers downwardly so that its lowermost portion constitutes the aforementioned bottom zone or collecting trough 20 for coagulated heavier contaminants. The motor or motors (not shown) which are used to drive the feed screw 21 can be operated continuously or intermittently.

Continuous operation of the feed screw 21 is preferred in many instances because a pronounced surge or thrust develops in the body of liquid within the receptacle 17 whenever the outlet for coagulated contaminants is opened to permit evacuation of such contaminants and their transport into the tank 14. The surge is beneficial in that it prevents coagulated contaminants from adhering to the surfaces of main lamellae 19. Adherence of contaminants to the lamellae 19 could cause clogging of passages between neighboring lamellae and could adversely affect the operation of the entire flotation unit 12a. However, the surge also produces certain undesirable effects, particularly because it tends to agitate the liquid in the receptacle 17. The intensity of surges can be reduced to an acceptable value (i.e., to a value which suffices to prevent adherence of coagulated contaminants to the lamellae 19 but is not sufficiently pronounced to cause excessive agitation of the body of liquid in the receptacle 17) by employing a so-called open feed screw 21 which is maintained in continuous rotary motion to deliver the descending coagulated contaminants into the range of an outlet valve (not shown in FIG. 2). The discharge end of the continuously rotated open feed screw 21 delivers to the valve plugs of gathered solid contaminants which are expelled from the bottom zone 20 during each preferably short-lasting opening of the valve to permit evacuation of plugs from the receptacle 17. The intervals during which the outlet valve for evacuation of contaminants from the bottom zone 20 remains open can be lengthened to thus ensure complete or practically complete evacuation of gathered solid contaminants and/or to enhance the intensity of the surges for the purposes of reliably preventing adherence of coagulated contaminants to the surfaces of lamellae 19.

The intensity of the surges will be selected in dependency on the quality of water in the receptacle 17 as well as in dependency on the nature and percentage of contaminants in the body of liquid which is confined in the receptacle. It is often desirable to select the mode of operation of the flotation unit 12 in such a way that the surges are weak or extremely weak because this greatly reduces the likelihood of excessive agitation of liquid in the receptacle 17, i.e., the rate and the manner of evacuating coagulated solid matter from the bottom zone 20 will be selected with a view to minimize the surges which develop when masses of coagulated contaminants are in the process of leaving the bottom zone 20.

The non-coagulated floccules rise in the receptacle 17 under the influence of gas bubbles and advance through the clearances between the lamellae 22 above the set of lamellae 19. The lamellae 22 are or can be smaller than the lamellae 19. The mutual spacing of lamellae 22, as well as the height of each of these lamellae, depends on the desired clarifying or purifying action in the receptacle 17. Depending on the composition, size and quantity of floccules to be segregated from the liquid fraction, the lamellae 22 can have a plane, undulate, zig-zag shaped, meandering or other suitable configuration.

The lamellae 19 are preferably inclined with reference to a vertical plane, the same as the lamellae 22. The inclination of lamellae 19 can be identical with or it can depart from the inclination of lamellae 22. Alternatively the inclination of lamellae 22 can be directly counter or opposite to the inclination of lamellae 19. The purpose of lamellae 22 is to offer a certain resistance to upward movement of floccules which tend to rise due to admission of liquid and floccules via inlet 18a of the receptacle 17. The layers or strips of floccules between the lamellae 22 are subject to a certain pressure which is attributable to the action of rising liquid in the receptacle 17, the weight of floccules floating on the body of liquid and the resistance of inclined lamellae 22 to upward movement of floccules which are driven upwardly by bubbles of a gaseous fluid. The just discussed pressure entails a certain compacting of the layer of floccules on the body of liquid and the expulsion of a certain percentage of liquid. It has been found that the layer at the upper surface of the body of liquid in the receptacle 17 contains between 30 and 40 percent of solid matter in contrast to approximately 10 percent which can be achieved if the lamellae 22 are omitted. If the layer which contains solid matter on top of the body of liquid in a conventional settling tank (without the lamellae 22) is thereupon compacted, the percentage of solids in the compacted mass is increased to approximately 20 percent, i.e., substantially one-half of the percentage of solids in the layer on top of the body of liquid in the tank 17 of FIG. 2. Thus, the improved apparatus can dispense with the units 14 and 15 because the receptacles 17 can furnish a product which contains between 30 and 40 percent of solid fraction without resorting to any pressing, filtering or analogous treatment.

The lamellae 22 preferably extend to a level at least slightly above the top surface of the body of liquid in the receptacle 17. Thus, the lamellae 22 establish room for floccules of contaminants to rise above the body of liquid, and this contributes to a significant increase of the solids content of the layer which gathers on top of the liquid body. The upper portion of such layer contains the lowest percentage of liquid, and such upper portion is skimmed off by one or more scrapers 23 in the form of elongated blades which are connected to endless chain conveyors 24 (only one shown) to be advanced along an endless path having a horizontal or nearly horizontal lower stretch above the upper edge faces of lamellae 22. The speed of movement of the scrapers 23 cannot be increased at will because, once a certain speed is exceeded, the scrapers exhibit the tendency to depress the upper portion of the layer of gathered contaminants back into the spaces between the lamellae 22. Furthermore, if the speed of the scrapers 23 is excessive, they tend to remove the upper portion of the layer of contaminants on top of the body of liquid before such upper portion was relieved of a substantial percentage of liquid. The efficiency of the scraping operation at the top of the receptacle 17 can be influenced by one or more additional factors including the height of lamellae 22, the inclination of such lamellae relative to a vertical plane and/or relative to the lamellae 19, the configuration of lamellae 22 and the mutual spacing of such lamellae. In other words, the consistency of the substance which is scraped off the layer of contaminants floating on the body of liquid in the receptacle 17 can be influenced in a number of ways, for example, in order to account for differences between the percentages of contaminants in successive portions or lengths of the stream of residue entering the receptacle 17 via inlet 18a.

It has been found that the operation of the feed screw 21 and of the associated outlet valve can be related to the parameters of the lamellae 22 and/or to the operation and design of the scraping means including the scrapers 23 in such a way that the rate of flow of liquid in the receptacle 17 is at least substantially constant which, in turn, enhances the predictability of operation of the entire flotation unit 12a, i.e., the predictability of the rate of segregation of contaminants from the liquid in the residue flowing in the conduit or conduits 2c.

As mentioned above, the aforediscussed surges can affect the efficiency of the flotation unit 12 in that they agitate the body of liquid in the receptacle 17 and oppose an optimal ascent of certain contaminants under the action of ascending gas bubbles as well as the descent of coagulated contaminants into the bottom zone 20 of the receptacle. Therefore, it is normally desired to select the operation of the flotation unit 12 in such a way that the agitation of liquid is reduced to a minimum and that there develops a laminar flow which is conducive to optimal segregation of contaminants from the liquid fraction. Agitation results in the development of waves at the upper surface of the body of liquid, and this can affect the dehydration of contaminants in the aforediscussed upper layer and the percentage of liquid fraction in the material which is removed by the scrapers 23. The lamellae 22 are capable of reducing the development of waves in the upper portion of the receptacle 17 because these lamellae preferably extend above the liquid surface and thus divide the body of liquid at the upper surface into a plurality of relatively small pools which are not overly agitated in response to the development of a surge and which become quescent practically immediately in contrast to the behavior of a relatively large uninterrupted liquid body. The extent to which the lamellae 22 project above the body of liquid in the receptacle 17 is preferably selected in such a way that the development of a surge does not entail the flow of liquid over the top edges of one or more neighboring lamellae 22.

The provision of evacuating means in the form of the aforediscussed feed screw 21 also contributes to predictability of operation of the flotation unit 12. In heretofore known settling tanks, the bottom portion of each tank is provided with one or more downwardly extending tubular outlets each of which is controlled by a discrete valve. The solid material which has gathered in the bottom portion of a conventional settling tank tends to accumulate adjacent (around) each tubular outlet and to form hills which rise to the level of and above the bottom edges of lamellae in the settling tank. The top portions of such hills clog the passages between neighboring lamellae and thus prevent freshly introduced solid materials from descending toward and into the tubular outlet or outlets.

Attempts to avoid the just discussed development of hills of solid materials in the interior of a conventional settling tank include the provision of mobile scraping, agitating and analogous devices. Such devices can break up the accumulations of solid materials; however, they agitate the liquid and the broken-up accumulations and thus interfere with efficient operation of a conventional settling tank. Therefore, the outlet or outlets of such settling tanks normally discharge flows which contain a relatively high percentage of liquids. This is undesirable in most instances, for example, when the segregated solid substances are to be recycled because the recycling must be preceded by costly and time-consuming dehydration. The same holds true if the solid material which is discharged via tubular outlet or outlets of a conventional settling tank is to be dumped, i e., the relatively high percentage of liquid in such material contributes to its bulk and weight and hence to the cost of dumping.

As already mentioned above, the feed screw 21 can cooperate with the outlet valve in the bottom zone 20 of the receptacle 17 in such a way that a surge which develops during opening of the valve is held to a minimum. At the same time, the feed screw 21 ensures a highly predictable evacuation of coagulated contaminants. The arrangement is preferably such that the feed screw 21 does not discharge directly into an opening but rather into a tubular body or nipple (see FIG. 6) which is nearly completely filled by the respective portion of the feed screw. This reduces the intensity of shocks and further reduces the percentage of liquid fraction which escapes through the nipple. The feed screw 21 maintains a plug of solid contaminants in a state of readiness ahead of and in the nipple so that the plug blocks the escape of liquid fraction. This, in turn, reduces the intensity of the shock and hence the extent of agitation of liquid in the receptacle 17.

Figure 3:
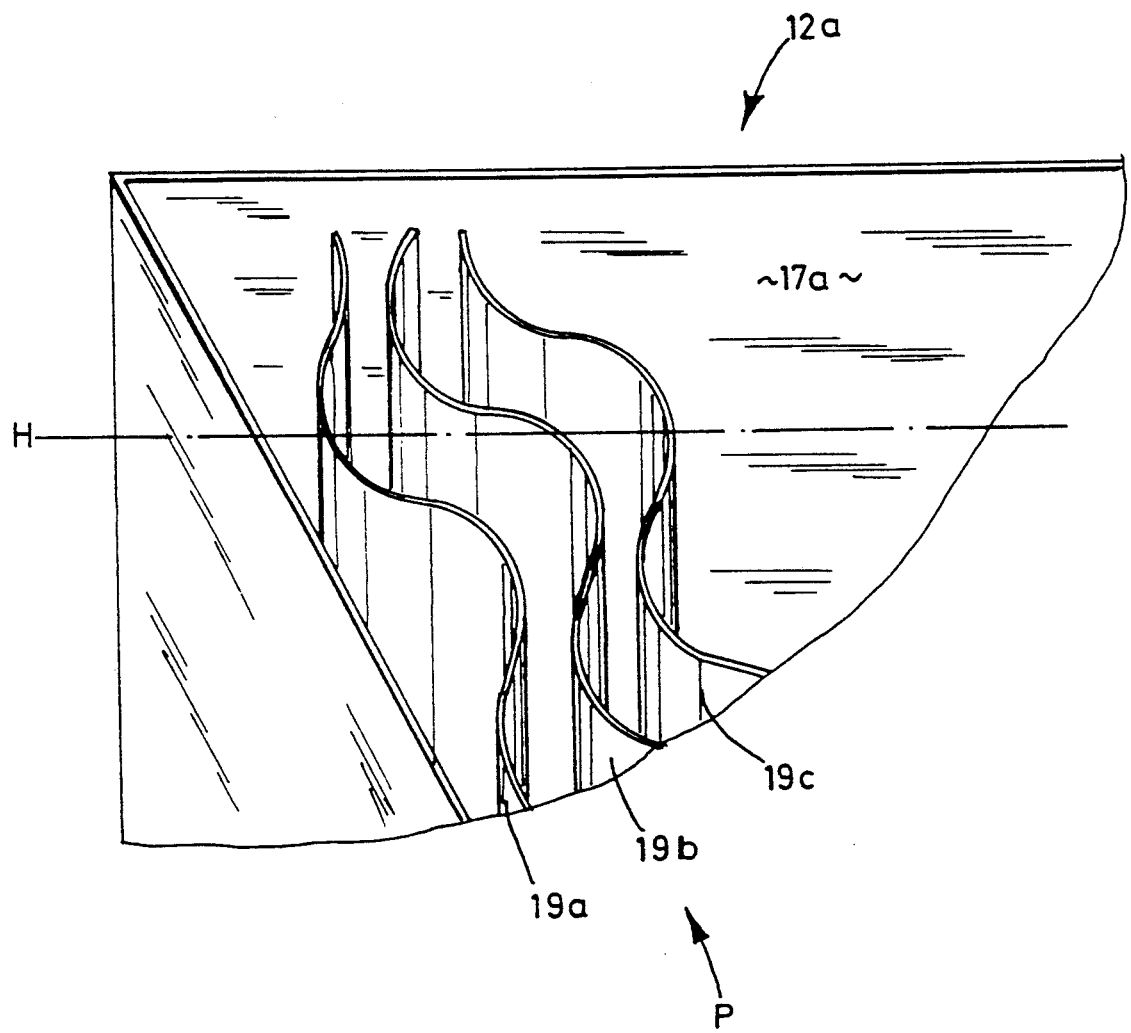
FIG. 3 is a fragmentary perspective view of a modified flotation unit.

FIG. 3 shows a portion of the receptacle 17a in a flotation unit 12a constituting a modification of the unit 12 which is shown in FIG. 2. Thus, the lamellae 19, 22 of the sets of lamellae in the receptacle 17 of FIG. 2 are assumed to be flat or substantially flat plates. On the other hand, FIG. 3 shows three lamellae 19a, 19b, 19c each of which has an undulate (sinusoidal) shape and which are not parallel to each other. Furthermore, the lamellae 19a–19c are not inclined to the vertical. The line H which is parallel to one wall but normal to another wall of the receptacle 17a of FIG. 3 intersects the maximum ordinate value of the curve which is represented by the lamellae 19a and the minimum ordinate values of the curves represented by the lamellae 19b and 19c. The lamellae 19b, 19c are also offset relative to each other. The arrow P indicates the direction of flow of liquid into the spaces between neighboring lamellae 19a, 19b, 19c. The liquid flows substantially horizontally. Since the width of the clearances between the neighboring lamellae varies continuously (as seen in the direction of arrow P), such clearances include zones where the liquid flows at a higher speed as Well as zones where the speed of liquid is much lower. This establishes highly satisfactory circumstances for the ascent of contaminants which are to rise to the top surface of the body of liquid in the receptacle 17a and to be removed by scrapers 23 (not shown in FIG. 3)or other suitable skimming devices The rate of ascent of floccules in the body of liquid in the receptacle 17 or 17a can be influenced by changing the inclination of lamellae relative to the vertical. Thus, by selecting the inclination of the lamellae, particularly of the lamellae of the upper set, the designer of the flotation unit or units can influence the rate of ascent of those contaminants which are to be removed at the top of the body of liquid in the receptacle 17 or 17a.

Referring again to FIG. 2, it will be noted that the direction of flow of residue from the outlet 18 into and through the inlet 18a is substantially at right angles to the planes of the lamellae 19. On the other hand, and as indicated in FIG. 3 by the arrow P, it is equally within the purview of the invention to select the direction of inflow of residue into the receptacle 7a in such a way that the direction is substantially parallel to the planes of the lamellae 19a–19c. The advantages of a settling tank employing a receptacle 17a with lamellae 19a–19c and one or more inlets discharging the residue in the direction of arrow P were explained above with reference to FIG. 3, i.e., the configuration of clearances between the lamellae 19a–19c promotes the ascent of solid material toward the upper surface of the body of liquid.

The undulate or sinusoidal lamellae 19a–19c of FIG. 3 can be replaced with zig-zag shaped or irregularly shaped lamellae (this holds true for the lamellae of the lower or main set as well as for those corresponding to the lamellae 22 shown in FIG. 2). All that counts (in order to achieve the advantages which were outlined with reference to the embodiment of FIG. 3) is to establish between pairs of neighboring lamellae clearances or paths for the flow of a liquid in such a way that the liquid is compelled to change its speed and to thus establish relatively quiet zones or pools which offer little resistance to upward movement of solid impurities to be scraped and/or otherwise removed at the top of the body of liquid in the respective receptacle.

FIG. 4 illustrates a further apparatus wherein the treatment is or can be identical with that described in connection with the apparatus of FIG. 1 except that the flotation units 12 of the first apparatus are replaced with settling units 25a, 25b, 25c which respectively include or are combined with the flocculators 11a, 11b, 11c. The sources 10, 10a supply additives (e.g., chemicals) to the streams of residue flowing in the flocculators 11a–11c, and the additives cause flocculation in the units 11a–11c, i.e., the liquid streams flowing into the receptacles or tanks of the units 25a, 25b, 25c contain floccules consisting of impurities or contaminants in the liquid fraction and minute particles of sand (if any). Each of the units 25a, 25b, 25c includes an inlet 26 for the stream of residue flowing from the vessel 7a, an overflow (not shown in FIG. 4) for clarified liquid, and an outlet 27 for settled contaminants. The over-flowing clarified liquid is returned into the conduit 2 for readmission into the mixing unit 1.

FIGS. 5 and 6 illustrate certain details of a presently preferred embodiment of a settling unit which can be utilized in the apparatus of FIG. 4. The unit 25a which is shown in FIGS. 5 and 6 comprises a receptacle having two inclined sidewalls 28 and two substantially upright end walls 29. The walls 28 converge toward the lowermost part of the receptacle of the settling unit 25a to define an elongated trough for a horizontal feed screw 30 which serves to evacuate solid contaminants or impurities by way of the nipple defining the outlet 27. The residue (containing a liquid fraction and a solid fraction including or consisting of the contaminants) is admitted via inlet 26, and the character 31 denotes the outlet for clear liquid. Such clear liquid overflows a barrier or partition 33 on its way into the outlet 31. Any floccules which are too light and too small to descend toward the feed screw 30 and advance over the partition 33 can be intercepted downstream of or at the outlet 31.

The receptacle of the settling unit 25a contains lamellae 32 which are inclined to the horizontal or to the vertical, e.g., at an angle of 50°–60°. The dimensions, configuration, inclination and/or other parameters of the lamellae 32 will be selected in dependency upon the contents of the material which is admitted into the unit 25a and upon the quality of the liquid fraction.

The provision of substantially vertical end walls 29 contributes to higher capacity of the unit 25a, i.e., the capacity exceeds that of a vessel (such as 7a) which has two pairs of downwardly converging walls. The inclined intermediate portions 29a of the walls 29 serve to ensure that the unit 25a can be installed (e.g., simply suspended) in a frame (such as the frame 16 of FIG. 2) which is designed for reception of a small receptacle (such as the receptacle 17 of FIG. 2).

Separators which are somewhat similar to those shown at 7 in FIGS. 1 and 4 are presently in use in certain slaughterhouses to separate oils, fats and other suspended substances from water which is used to clean such establishments. Quite surprisingly, separators of this character have been found to be ideally suited for separation of minute particles of sand from water which has been relieved of large and medium-sized particles of sand but still carries contaminants including aromates, oils and/or heavy metals. Thus, whereas the separators in slaughterhouses serve to separate oils and fats from water, the separators 7 which are shown in FIGS. 1 and 4 serve to segregate minute particles of sand (including those having a particle size in the range of approximately 10 microns) from water which contains contaminants including oil. Up to the present time, separation of sand particles with a size in the range of 10 microns from a body of water was considered to be impossible or practically impossible, at least at a reasonable cost.

The rate of admission of gas into the receptacles 17 will depend upon the weight of floccules in the respective bodies of liquid. Such admission of gas can be dispensed with if the apparatus is constructed in a manner as described with reference to FIG. 4 wherein the flotation units 12a-12c are replaced with settling units 25a-25c. It is clear that the improved apparatus can employ a single unit 12 or 25 or two, four or more such units, depending on the desired output. The decision to operate with one or more flotation units 12 or with one or more settling units 25 will depend upon the quality of the liquid fraction and upon the nature of contaminants therein. The apparatus of FIG. 1 exhibits the advantage that floccules can be removed at the top as well as at the bottom of each receptacle 17. On the other hand, the apparatus of FIG. 4 exhibits the advantage that the units 25 need not be provided with scrapers or other suitable skimming means. Apparatus of FIG. 1 will be preferred if it is desired to remove segregated contaminants which contain a relatively low percentage of a liquid. This can be achieved in that the ascending floccules urge the floccules above them to rise between the lamellae 22 above the liquid level and to be relieved of a very high percentage of water prior to being removed by the scrapers 23. As already mentioned above, some of the liquid fraction is also expelled due to the development of compressive forces which are attributable to upward movement of floccules between the lamellae 22.

The utilization of receptacles 17 and 25a-25c having downwardly tapering lower portions (which can have a conical or other suitable shape) also contributes to more satisfactory segregation of contaminants (and of minute particles of sand, if any) from the body of liquid. Such downwardly tapering lower portions promote the descent of floccules into the range of the feed screws 21 or 30 for evacuation from the respective receptacles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of processing building rubble which contains large, medium-sized and small solid particles and contaminants, comprising the steps of mixing rubble with a liquid; separating large and medium-sized particles from the thus obtained mixture to form a residue which contains contaminants, liquid and small solid particles; admitting the residue into an internally laminated separator vessel and separating the contaminants and liquid from at least some of the small particles; flocculating the separated liquid to accumulate therein floccules of contaminants and small solid particles, if any; and segregating the floccules from the liquid.

2. The method of claim 1, wherein said segregating step includes separating the floccules by sedimentation.

3. The method of claim 1, wherein said segregating step includes separating the floccules by flotation.

4. The method of claim 1, wherein the liquid is water and the solid particles include small, medium-sized and large particles of sand.

5. The method of claim 1, wherein said step of separating the contaminants and the liquid from at least some of the small particles comprises continuously evacuating the thus separated small particles from the separator vessel.

6. Apparatus for processing building rubble which contains large, medium-sized and small solid particles and contaminants, comprising means for mixing rubble with a liquid; a first treating unit including means for separating large and medium-sized particles from the thus obtained mixture to form a residue which contains contaminants, liquid and small solid particles; a second unit including means for treating the residue and having a vessel provided with internal laminations arranged to promote separation of contaminants and liquid from at least some of the small solid particles and means for evacuating the thus separated small solid particles from the vessel; and a third treating unit including means for flocculating the separated liquid to form floccules, a receptacle for confinement of flocculated liquid which contains floccules of contaminants and small solid particles, if any, and means for segregating floccules from liquid.

7. The apparatus of claim 6, wherein the liquid fills said receptacle to a predetermined level and said segregating means includes a plurality of sets of lamellae in said receptacle including a first set beneath said level and a second set located above said first set and extending at least to said level, the floccules in said receptacle tending to rise to and above said level and said segregating means further including means for skimming floccules off the liquid above said second set of lamellae.

8. The apparatus of claim 7, wherein at least some lamellae of said first set are inclined with respect to at least some lamellae of said second set.

9. The apparatus of claim 7, wherein at least some lamellae of at least one of said sets are inclined relative to a vertical plane.

10. The apparatus of claim 7, wherein said skimming means includes at least one scraper and means for moving said at least one scraper relative to said receptacle and relative to said second set of lamellae.

11. The apparatus of claim 10, wherein said moving means comprises means for advancing said at least one scraper along an endless path.

12. The apparatus of claim 7, wherein at least some lamellae of said first set are inclined in a first direction and at least some lamellae of said second set are inclined in a second direction substantially counter to said first direction.

13. The apparatus of claim 7, wherein said receptacle includes a downwardly tapering lower portion for collection of floccules and said segregating means further comprises means for evacuating collected floccules from the lower portion of said receptacle.

14. The apparatus of claim 6, wherein said receptacle includes a settling tank having a downwardly tapering lower portion for collection of floccules, and means for evacuating floccules from said lower portion.

15. The apparatus of claim 14, wherein said segregating means includes a plurality of lamellae in said tank at least in part above said lower portion.

16. The apparatus of claim 14, wherein said tank has an inlet for flocculated liquid, an outlet for segregated liquid and an outlet for floccules.

17. The apparatus of claim 6, further comprising means for recirculating at least some liquid from said receptacle to said mixing means.

* * * * *